(12) United States Patent
Goedecke et al.

(10) Patent No.: US 10,744,433 B2
(45) Date of Patent: Aug. 18, 2020

(54) CLEAN-SIDE WATER-SEPARATING FILTER ELEMENT HAVING BAYONET CONNECTION, AND FUEL FILTER HAVING A FILTER ELEMENT OF THIS TYPE

(71) Applicant: MANN+HUMMEL GMBH, Ludwigsburg (DE)

(72) Inventors: Marco Goedecke, Vaihingen (DE); Holger Beyerlin, Friolzheim (DE); Gunther Kraft, Ludwigsburg (DE); Andreas Wildermuth, Marbach (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 138 days.

(21) Appl. No.: 15/598,133

(22) Filed: May 17, 2017

(65) Prior Publication Data

US 2017/0252683 A1    Sep. 7, 2017

Related U.S. Application Data

(63) Continuation of application No. PCT/EP2015/076610, filed on Nov. 13, 2015.

(30) Foreign Application Priority Data

Nov. 20, 2014   (DE) .................. 10 2014 017 120

(51) Int. Cl.
*B01D 29/60* (2006.01)
*G03F 7/16* (2006.01)
(Continued)

(52) U.S. Cl.
CPC .......... *B01D 36/005* (2013.01); *B01D 29/13* (2013.01); *B01D 29/21* (2013.01); *B01D 29/56* (2013.01);
(Continued)

(58) Field of Classification Search
CPC ........ F02M 37/24; F02M 37/26; F02M 37/28; B01D 2201/4015; B01D 2201/291;
(Continued)

(56) References Cited

U.S. PATENT DOCUMENTS

| 6,881,328 B2 * | 4/2005 | Dittmann | ............... F02M 37/24 |
| | | | 210/86 |
| 10,010,815 B2 * | 7/2018 | Sturgess | ................. B01D 35/18 |

(Continued)

FOREIGN PATENT DOCUMENTS

| DE | 102012000876 B3 * | 3/2013 | .......... B01D 35/153 |
| WO | 2011107262 A1 | 9/2011 | |

(Continued)

*Primary Examiner* — Terry K Cecil
(74) *Attorney, Agent, or Firm* — James Hasselbeck

(57) ABSTRACT

A filter element for a fuel filter has first and second end plates and a particle filter medium arranged between the first and second end plates. A bayonet protrusion on the first end plate is designed to engage a bayonet receptacle of the filter housing by rotation of the filter element about a filter element longitudinal axis. An internal sealing element on the second end plate is designed to separate a raw side from a water collecting chamber of the fuel filter. The filter housing has a filter housing body and a cover screwed onto the filter housing body. The filter housing has a bayonet receptacle arranged on its inner side. By rotating the filter element about a filter element longitudinal axis of the filter element, the bayonet protrusion engages the bayonet receptacle of the filter housing when the cover is unscrewed from the filter housing body.

18 Claims, 3 Drawing Sheets

(51) Int. Cl.

| | |
|---|---|
| *B01D 37/04* | (2006.01) |
| *B01D 35/02* | (2006.01) |
| *B01D 36/00* | (2006.01) |
| *F02M 37/24* | (2019.01) |
| *B01D 35/18* | (2006.01) |
| *B01D 29/21* | (2006.01) |
| *B01D 29/58* | (2006.01) |
| *B01D 29/13* | (2006.01) |
| *B01D 29/56* | (2006.01) |
| *G01F 23/26* | (2006.01) |
| *F02M 37/26* | (2019.01) |
| *F02M 37/28* | (2019.01) |
| *F04B 43/08* | (2006.01) |

(52) U.S. Cl.
CPC ............. *B01D 29/58* (2013.01); *B01D 35/18* (2013.01); *B01D 36/006* (2013.01); *B01D 37/046* (2013.01); *F02M 37/24* (2019.01); *G01F 23/26* (2013.01); *B01D 2201/202* (2013.01); *B01D 2201/24* (2013.01); *B01D 2201/291* (2013.01); *B01D 2201/347* (2013.01); *B01D 2201/4015* (2013.01); *F02M 37/26* (2019.01); *F02M 37/28* (2019.01); *F04B 43/08* (2013.01)

(58) Field of Classification Search
CPC .......... B01D 2201/295; B01D 2201/20; B01D 2201/202; B01D 29/606; B01D 35/02; B01D 37/046; B01D 2201/24; B01D 2201/347; B01D 29/13; B01D 29/21; B01D 29/56; B01D 29/58; B01D 35/18; B01D 36/005; B01D 36/006; B01D 2201/4007; F04B 43/02; F04B 43/08; F04B 53/10; F04B 53/20; G03F 7/16; G01F 23/26

See application file for complete search history.

(56) References Cited

U.S. PATENT DOCUMENTS

| | | | |
|---|---|---|---|
| 2005/0000886 A1* | 1/2005 | Reynolds | ............... B01D 29/21 210/450 |
| 2009/0301950 A1 | 12/2009 | Weindorf | |
| 2015/0021246 A1 | 1/2015 | Sturgess | |

FOREIGN PATENT DOCUMENTS

| | | | | |
|---|---|---|---|---|
| WO | 2013083309 A1 | 6/2013 | | |
| WO | WO-2013135440 A1 * | 9/2013 | ............ | B01D 35/18 |

\* cited by examiner

CLEAN-SIDE WATER-SEPARATING FILTER ELEMENT HAVING BAYONET CONNECTION, AND FUEL FILTER HAVING A FILTER ELEMENT OF THIS TYPE

CROSS-REFERENCE TO RELATED APPLICATIONS

This application is a continuation application of international application No. PCT/EP2015/076610 having an international filing date of 13 Nov. 2015 and designating the United States, the international application claiming a priority date of 20 Nov. 2014, based on prior filed German patent application No. 10 2014 017 120.5, the entire contents of the aforesaid international application and the aforesaid German patent application being incorporated herein by reference.

BACKGROUND OF THE INVENTION

The invention concerns a filter element for a fuel filter of a motor vehicle. The invention concerns moreover a fuel filter with such a filter element. A filter element for filtering fuel of a motor vehicle is disclosed in DE 10 2012 000 876 B3. The known filter element is arranged suspended in a filter housing. For connecting the filter element to the filter housing, a bayonet connection is provided.

EP 1 638 664 B1 discloses a filter element that is fastenable by locking hooks on a cover of a filter housing.

Moreover, US 2004/0154975 A1 discloses a liquid filter with a filter element that can be locked in the cover of the liquid filter.

Moreover, DE 196 44 647 A1 discloses an oil filter. The oil filter comprises a fastening flange and a cover. The cover can be screwed onto the fastening flange. A filter element of the oil filter is locked on the fastening flange.

EP 2 070 575 A1 discloses a filter element that can be fastened by means of a bayonet connection on a cover of a filter housing. The cover can be screwed onto a filter housing body of the filter housing. In this way, an upright assembly of the filter element is possible.

US 2011/0147297 A1 discloses a water-separating fuel filter with a filter element and with a filter housing wherein the filter element is connectable by a bayonet connection to the filter housing.

EP 2 335 796 A1 discloses an oil filter with a closable outlet. A filter element of the oil filter is insertable by guide webs into a filter housing of the oil filter.

WO 2011/127920 A1 discloses a filter with a prefilter and a main filter. The filter comprises a cover that is connectable by contours with the prefilter or the main filter.

Finally, US 2008/0190839 A1 discloses a liquid filter for motor vehicles that comprises a filter element that is detachably connectable by a screwing movement to a cover of the liquid filter.

In the known fuel filters, unfiltered fuel at the raw side often passes inadvertently into the water collecting chamber of the fuel filter.

SUMMARY OF THE INVENTION

The invention has therefore the object to provide a clean-side water-separating filter element and a fuel filter that prevent/s unfiltered fuel from passing into the water collecting chamber.

The object according to the invention is solved by a clean-side water-separating filter element for a fuel filter of a motor vehicle wherein the filter element is insertable into a filter housing of the fuel filter and comprises the following features:

a) a particle filter medium that is arranged between a first end plate and a second end plate of the filter element;
b) a bayonet protrusion in the area of the first end plate which is configured to engage behind a bayonet receptacle of the filter housing upon rotation of the filter element about its filter element longitudinal axis;
c) an internal sealing element for separating a raw side of the fuel filter from a water collecting chamber of the fuel filter, wherein the internal sealing element is arranged in the area of the second end plate.

The dependent claims provide expedient further embodiments of the invention.

By means of the bayonet protrusion, the filter element is held by a bayonet connection safely on a part of the filter housing during opening of the filter housing in the context of a filter element exchange. The internal sealing element ensures a separation of the raw side of the fuel filter from its water collecting chamber. A contamination of the separated water by fuel from the raw side of the fuel filter is therefore reliably prevented in operation of the fuel filter. As a whole, the filter element is thus designed to be very environmentally friendly.

The first end plate, in particular in the operating state of the filter element, is the top end plate, the second end plate in the operating state is the bottom end plate of the filter element.

Preferably, the internal sealing element is designed in the form of a radial sealing element, in particular in the form of an O-ring. This enables a constructively particularly simple configuration of the filter element.

Particularly preferred, the internal sealing element is arranged on the second end plate so as to face radially outwardly.

The seal-tightness of the internal sealing element is particularly high when the internal sealing element is arranged in an internal sealing element groove whose opening is facing away from the filter element longitudinal axis in radial direction. Due to the internal sealing element groove which is facing away from the filter element longitudinal axis, the internal sealing element is contacting an inner side of the filter housing in operation of the fuel filter.

The manufacture of the filter element is simplified when it is configured to be of axial symmetry relative to its filter element longitudinal axis.

A quick water drainage from the filter element is achieved when the filter element has a water discharge opening, in particular a sedimentation gap.

In a preferred embodiment of the invention, the filter element comprises a final separator screen and/or a coalescing medium between particle filter medium and final separator screen. This enables a particularly high water separation rate of the filter element.

The object according to the invention is furthermore solved by a fuel filter with a filter housing and a filter element as described above, wherein the filter housing comprises a cover which is screwable onto a filter housing body and wherein the filter housing comprises on the inner side a bayonet receptacle that is configured such that the bayonet protrusion of the filter element engages the bayonet receptacle when the cover is unscrewed from the filter housing body.

Bayonet protrusion and bayonet receptacle form a bayonet connection. In the bayonet connection, bayonet protrusion and bayonet receptacle are frictionally connected to each other. The friction coefficient of this frictional connection is smaller than the friction coefficient between the internal sealing element and a wall section of the filter housing against which the internal sealing element is resting. In other words, the friction between internal sealing element and filter housing is greater than the friction between bayonet protrusion and bayonet receptacle. In this way, the bayonet protrusion engages the bayonet receptacle when the cover is unscrewed from the filter housing and opens the bayonet connection when the cover is screwed onto the filter housing.

The filter element can be arranged upright in the filter housing. In this case, the bayonet receptacle is provided in the cover. When the cover is screwed on, the filter element is disconnected from the cover. When the cover is unscrewed, the filter element is connected to the cover. When exchanging the filter element, the filter element is thus removable together with the cover from the filter housing body.

Alternatively, the bayonet receptacle can be arranged or formed in the filter housing body wherein the filter element can be arranged suspended in the filter housing by means of the bayonet receptacle. The filter housing body is fixedly connected with a fuel supply line and a fuel discharge line. When the cover is unscrewed, the filter element is connected to the filter housing body. When the cover is screwed on, the filter element is detached from the filter housing body. Vibrations during operation of the fuel filter are therefore not transmitted from the filter housing body onto the filter element. A suspended installation of the filter element has moreover the advantage that, when separating the cover from filter housing body, liquid contained in the cover is retained therein and thus does not mix with other liquids or escape into the environment.

In a particularly preferred embodiment of the invention, the filter housing has an external sealing element between cover and filter housing body. The connection between filter housing body and cover is sealed by the external sealing element relative to the environment in order to reliably prevent escape of fuel from the raw side of the fuel filter into the environment.

The external sealing element can be embodied in the form of a radial sealing element, in particular in the form of an O-ring, wherein the external sealing element is arranged in an external sealing element groove. In this way, a high seal-tightness of the raw side of the fuel filter relative to the environment is achieved.

Preferably, the external sealing element is arranged in the cover. The external sealing element is then easily accessible and exchangeable in case of wear.

In a further embodiment of the invention, the external sealing element and the internal sealing element are arranged on the fuel filter such that, upon unscrewing of the cover, first the sealing action of the internal sealing element and subsequently the sealing action of the external sealing element is canceled. In other words, upon demounting of the cover, the external sealing element has a sealing seat parallel to the filter element longitudinal axis for a longer period of time than the internal sealing element. In this way, when unscrewing the cover, fuel from the raw side is discharged via the canceled sealing action of the internal sealing element and only thereafter the connection of the filter housing body relative to the environment is produced via the canceled sealing action of the external sealing element. This measure prevents reliably escape of fuel from the raw side of the fuel filter into the environment. The described measure is particularly advantageous in case of a suspended installation of the filter element because in this case the fuel is drained into the cover and collected therein when the cover is unscrewed.

The filter housing, in particular the cover of the filter housing, comprises preferably a reversible openable and closable drainage device for discharging the separated water. For discharging the water separated from the fuel, it is thus not required to unscrew the cover from the filter housing body; this further reduces the risk of a contamination of the environment with fuel or the risk of mixing of liquids between raw side and water collecting chamber in the fuel filter.

Upon servicing, the separated water and filtered fuel can thus be discharged through the drainage device. Subsequently, the drainage device can be closed and the cover can be unscrewed so that the unfiltered fuel flows into the cover and can be removed. Subsequently, the filter element can be exchanged. In summary, prior to the filter element exchange, water (together with already purified fuel) can be drained from the fuel filter separate from the raw-side fuel.

The fuel filter is constructively of a particularly simple design and therefore can be produced inexpensively when the drainage device is embodied in the form of a plug.

In a further preferred embodiment of the invention, the filter housing has water level electrodes spaced apart from each other for measuring the water level in the filter housing. The water level electrodes project in this context preferably into an upper part of a water collecting chamber of the fuel filter. The water level electrodes detect when a maximum water filling level is surpassed; this is indicated in the form of a service signal.

Particularly preferred, the water level electrodes are arranged or embodied on a water level electrode column wherein the water level electrode column comprises a fuel drain. In this way, a particularly compact arrangement of water level electrodes and fuel drain from the filter element is enabled.

The water level electrode column is preferably reversibly detachably connected to the filter element so that the water level electrode column must not be replaced in case of a filter element exchange. In this way, costs and waste can be reduced.

The filter housing comprises preferably a heating electrode for heating the fuel. In this context, the heating electrode is preferably welded in the area of the bayonet receptacle to the filter housing. In this way, the filter is constructively embodied particularly simple and inexpensive.

Further preferred, the bayonet protrusion of the filter element is pointing radially inwardly. In this way, sharp outwardly oriented edges on the filter element are avoided.

The radial dimensions of the bayonet protrusion are preferably greater than the radial dimensions in the opening cross section of the cover. In other words, the radial outer diameter of the bayonet protrusion is preferably greater than the radial inner diameter of the cover in the area of its opening. In this way, faulty installation of the filter element in the filter housing is prevented.

Further preferred, the area of the filter element positioned at the bottom in operation has a removal aid for easily releasing the bayonet connection.

In a further preferred embodiment of the invention, the water level electrode column is reversibly detachably connected to the filter housing so that a defective water level electrode column can be exchanged without having to replace the entire filter housing.

BRIEF DESCRIPTION OF THE DRAWINGS

Further features and advantages of the invention result from the following detailed description of an embodiment of the invention, with the aid of the figures of the drawing illustrating details important to the invention, as well as from the claims.

The features illustrated in the drawing are illustrated such that the inventive particularities are clearly visible. The different features can be realized each individually or several combined in any combinations in variants of the invention.

DESCRIPTION OF PREFERRED EMBODIMENTS

Figure 1:
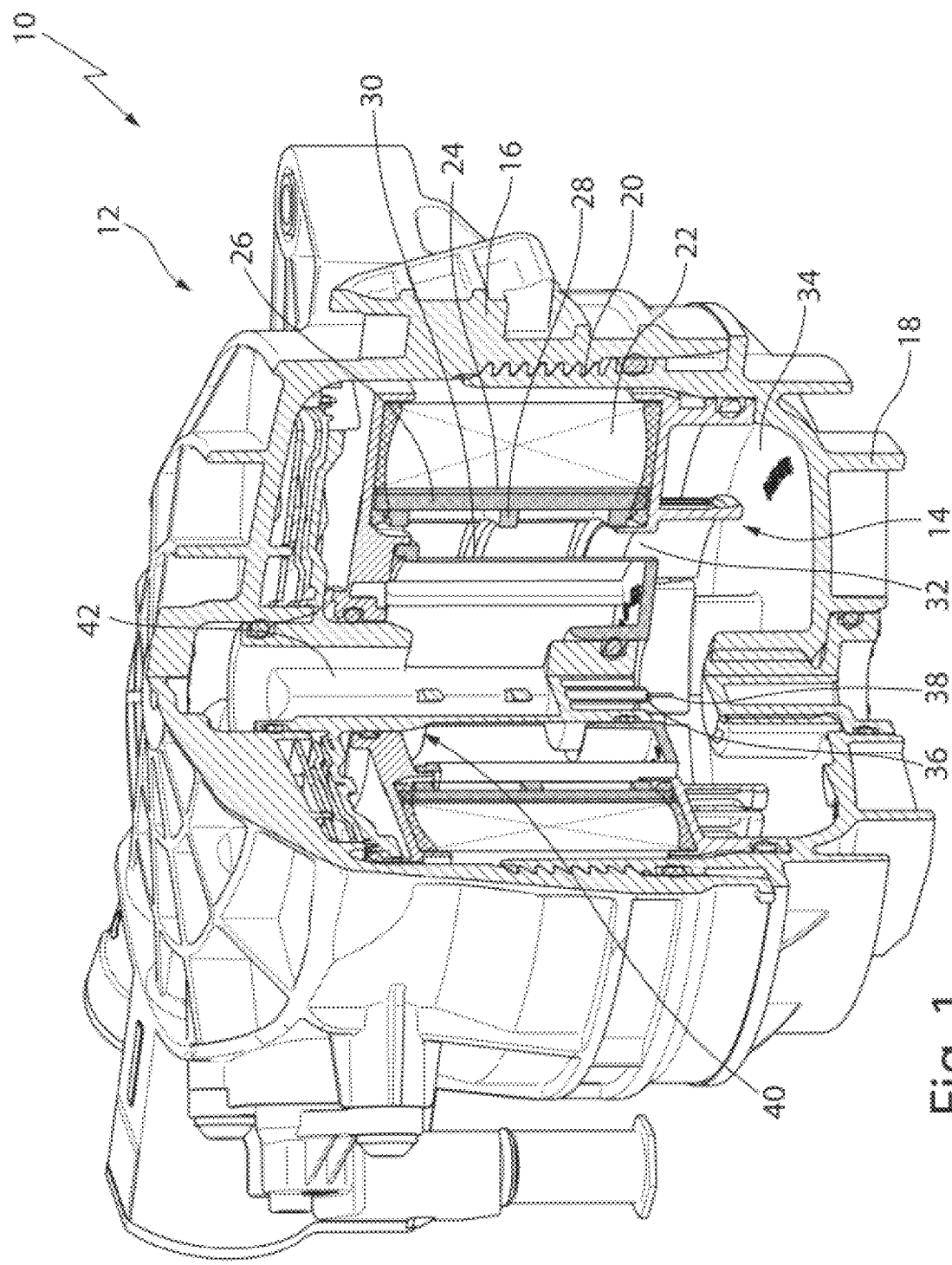
FIG. 1 is a perspective partially sectioned view of a fuel filter.

FIG. 1 shows a fuel filter 10 with a filter housing 12 and a filter element 14 installed in the filter housing 12. The filter housing 12 comprises a filter housing body 16 and a cover 18. The cover 18 is screwed on by a thread 20 onto the filter housing body 16. For exchange of the filter element 14, the cover 18 is unscrewed from the filter housing body 16.

The filter element 14 is designed to filter out dirt and separate water in multiple stages in order to fulfill high requirements in regard to the purity and waterlessness of the filtered fuel. The filter element 14 comprises for this purpose a particle filter medium 22. The particle filter medium 22 is folded several times to a star shape in order to provide a great surface area. Following the flow of the fuel, the filter element 14 comprises a first coalescing medium 24 adjoining the particle filter medium 22 that is in the form of a nonwoven. Water droplets form on the first coalescing medium 24. Downstream of the first coalescing medium 24, a coarser second coalescing medium 26 for enlarging the water droplets is provided. The second coalescing medium 26 is contacting inwardly a support body 28. Between the support body 28 and a final separator screen 30, a sedimentation gap 32 is formed. The final separator screen 30 functions as a "baffle plate" for separating the water droplets which, following the force of gravity, flow across the sedimentation gap 32 into a water collecting chamber 34 of the filter housing 12.

In the filter housing 12, water level electrodes 36, 38 are provided that are spaced apart relative to each other in order to detect when a maximum filling level of the water in the water collecting chamber 34 is reached. The water level electrodes 36, 38 are arranged in a water level electrode column 40. The water level electrode column 40 comprises a fuel drain 42.

Figure 2:
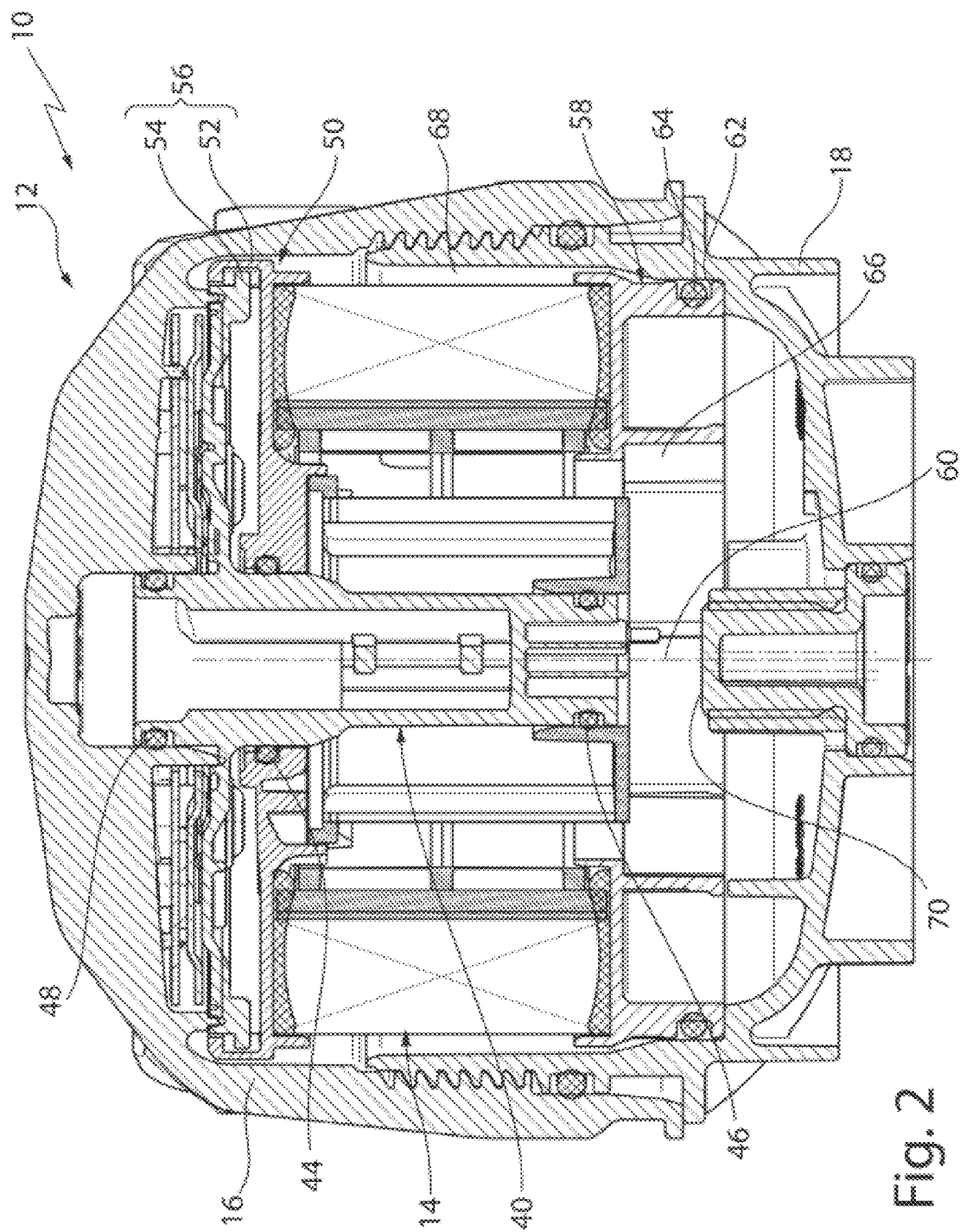
FIG. 2 shows a sectioned side view of the fuel filter of FIG. 1.

FIG. 2 shows the fuel filter 10 in a sectioned side view. FIG. 2 shows that the water level electrode column 40 is reversibly detachably connected to the filter element 14. The water level electrode column 40 is coupled in this context by sealing rings 44, 46 to the filter element 14. Moreover, the water level electrode column 40 is reversibly detachably connected to the filter housing body 16. The water level electrode column 40 is coupled by a sealing ring 48 to the filter housing body 16. The sealing rings 44, 46, 48 are formed as radial sealing rings, respectively.

The filter element 14 is installed suspended from the filter housing body 16. For connecting the filter element 14 to the filter housing body 16, a "U"-shaped bayonet protrusion 52 is provided on an our circumference of a first end plate 50 of the filter element 14. The bayonet protrusion 52 opens radially inwardly for engaging a bayonet receptacle 54 of the filter housing body 16. The bayonet protrusion 52 and the bayonet receptacle 54 form a bayonet connection 56.

In FIG. 2, the cover 18 is completely screwed onto or partially screwed into the filter housing body 16. In this state, the bayonet connection 56 is open, i.e., the filter element 14 is vibration decoupled from the filter housing body 16.

The filter element 14 comprises a second end plate 58. The second end plate 58 is opposite the first end plate 50 in direction of the filter element longitudinal axis 60. The second end plate 58 comprises an internal sealing element groove 62 whose opening is facing away from the filter element longitudinal axis 60 in radial direction. An internal sealing element 64 is arranged in the internal sealing element groove 62. The internal sealing element 64 is in the form of a radial sealing element, more precisely, in the form of an O-ring. The internal sealing element 64 separates a clean side 66 from a raw side 68 of the fuel filter 10. The internal sealing element 64 prevents fuel from passing from the raw side 68 to the clean side 66 or into the water collecting chamber 34.

The fuel filter 10 comprises a drainage device 70 in the form of a plug. Through the drainage device 70, separated water (together with purified fuel) can be drained. After drainage of the water, the drainage device 70 can be closed in order to subsequently drain—separate from water and purified fuel—unpurified fuel by unscrewing the cover 18 and exchange the filter element 14.

The internal sealing element 64 is positioned with frictional connection on a wall section of the cover 18. The sealing action between the internal sealing element 64 and the wall section of the cover 18 that is resting against the internal sealing element 64 has in this context a greater friction coefficient than the bayonet connection 56. When unscrewing the cover 18, the filter element 14 is thus turned together with the cover 18. In doing so, the bayonet connection 56 closes. When the bayonet connection 56 is closed, the bayonet connection 56 blocks a further rotation of the filter element 14 relative to the filter housing body 16. Upon further rotation of the cover 18 (unscrewing the cover 18), a rotation of the cover 18 relative to the filter element 14 occurs instead. The cover 18 is thus unscrewed from the filter housing body 16 while the filter element 14 stays connected to the filter housing body 16.

Figure 3:
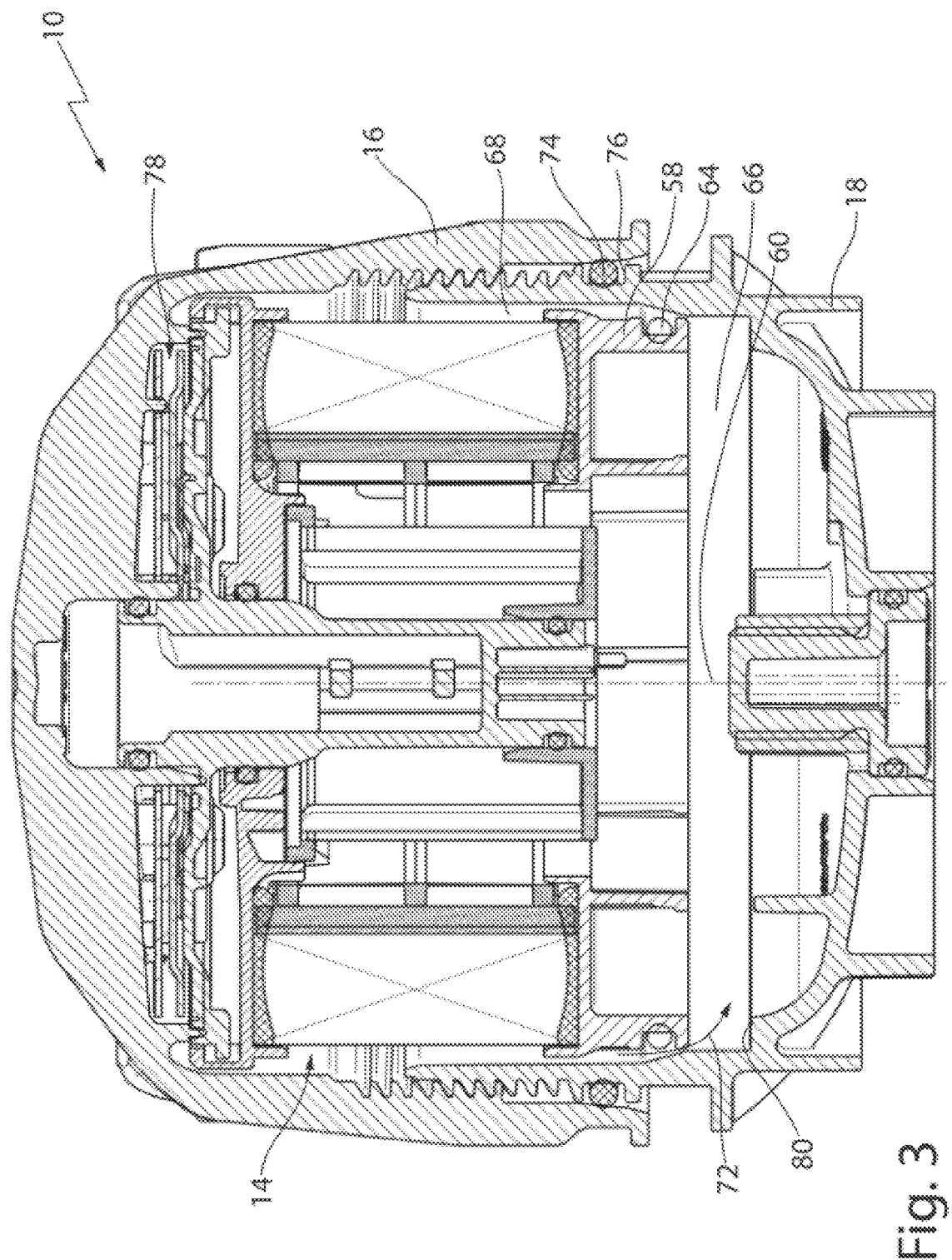
FIG. 3 is a sectioned side view of the fuel filter according to FIG. 2 with partially unscrewed cover.

FIG. 3 shows the fuel filter 10 with cover 18 partially unscrewed with the annular support wall 80 of the cover 18 backed away from a bottom wall of the second end plate 58. The internal sealing element 64 is disengaged from the cover 18. In this way, unpurified fuel from the raw side 68 can drain in the direction of arrow 72 into the cover 18. The unpurified fuel can thus be collected separate from the water and the purified fuel in the cover 18 prior to filter element exchange. The escape of fuel into the environment is thus prevented by an external sealing element 74. The seal between cover 18 and filter housing body 16 by means of the external sealing element 74 is still closed when the sealing action between filter element 14 and cover 18 by means of the internal sealing element 64 is already canceled. In this way, the exclusive fuel drainage into the cover 18 upon unscrewing the cover 18 is reliably ensured.

The external sealing element 74 is designed in the form of a radial sealing element, here in the form of an O-ring. The external sealing element 74 is arranged in an external sealing element groove 76.

For heating the fuel, in particular for filtering diesel fuel, a heating electrode 78 is provided in the fuel filter 10.

In summary, the invention concerns an at least single-stage water-separating filter element for a fuel filter. In the direction of its filter element longitudinal axis, the filter element comprises at one end a bayonet protrusion for fastening the filter element in a filter housing of the fuel filter. At the other end, the filter element comprises an internal sealing element. The internal sealing element enables a separation of raw side and water collecting chamber of the fuel filter. The filter housing comprises a filter housing body and a cover whose connection is preferably sealed by an external sealing element. External sealing element and internal sealing element are preferably arranged such that, upon separation of the cover from the filter housing body, first the sealing action of the internal sealing element and subsequently the sealing action of the external sealing element is canceled.

What is claimed is:

1. A clean-side water-separating filter element for a fuel filter insertable into a filter housing of the fuel filter, the filter element having a longitudinal axis and comprising:
    a particle filter medium arranged between a first end plate and a second end plate;
    wherein the first end plate has a central opening extending through the first end plate, a groove formed into a wall of the central opening and a sealing ring arranged in the groove;
    wherein the second end plate forms an annular axially projecting wall on an axially outer side of the second end plate, the annular axially projecting wall positioned proximate to a radially outermost circumferential surface of the second end plate, the annular axially projecting wall projecting axially outwardly away from the particle filter medium;
    wherein the second end plate further comprises an internal sealing element groove formed into a radially outer surface of the annular axially projecting wall;
    wherein an internal sealing element is arranged in the internal sealing element groove;
    a coalescing medium arranged on a radially inner face of the particle filter medium and downstream of the particle filter medium;
    a bayonet protrusion arranged on a radially outer circumference of the first end plate, the bayonet protrusion formed as a "U"-shaped projection on the radially outer circumference of the first end plate, the "U"-shaped projection projecting axially outwardly away from an outer side of the first end plate, the "U"-shaped projection opening radially inwardly to receive and engage a bayonet receptacle of the filter housing into an interior of the "U"-shaped projection,
    wherein the "U"-shaped projection is configured to engage a bayonet receptacle of the filter housing by rotation of the filter element about the filter element longitudinal axis of the filter element;
    wherein the internal sealing element is configured to separate a raw side of the fuel filter from a water collecting chamber of the fuel filter.

2. The filter element according to claim 1, wherein the internal sealing element is a radial sealing element.

3. The filter element according to claim 2, wherein the radial sealing element is an O-ring.

4. The filter element according to claim 1, further comprising
    a water discharge opening.

5. The filter element according to claim 4, wherein the water discharge opening is a sedimentation gap.

6. The filter element according to claim 1, further comprising
    a final separator screen downstream of the particle filter medium.

7. The filter element according to claim 1, further comprising
    a final separator screen,
    wherein the coalescing medium is arranged between the particle filter medium and the final separator screen.

8. A fuel filter comprising:
    a filter housing comprising
        a filter housing body and
        a cover that is screwable onto the filter housing body;
    wherein the filter housing comprises
        a bayonet receptacle arranged on an inner side of the filter housing;
    a filter element having a longitudinal axis and disposed in the filter housing and comprising
    a particle filter medium arranged between a first end plate and a second end plate,
        wherein the second end plate forms an annular axially projecting wall on an axially outer side of the second end plate, the annular axially projecting wall positioned proximate to a radially outermost circumferential surface of the second end plate, the annular axially projecting wall projecting axially outwardly away from the particle filter medium;
        wherein the second end plate further comprises an internal sealing element groove formed into a radially outer surface of the annular axially projecting wall;
        wherein an internal sealing element is arranged in the internal sealing element groove;
        a coalescing medium arranged on a radially inner face of the particle filter medium and downstream of the particle filter medium;
        wherein a bayonet protrusion is arranged on a radially outer circumference of the first end plate, the bayonet protrusion formed as a "U"-shaped projection on the radially outer circumference of the first end plate, the "U"-shaped projection projecting axially outwardly away from an outer side of the first end plate, the "U"-shaped projection opening radially inwardly to receive and engage the bayonet receptacle of the filter housing into an interior of the "U"-shaped projection;
        wherein, by rotating the filter element about a filter element longitudinal axis of the filter element, the bayonet protrusion is configured to engage the bayonet receptacle of the filter housing when the cover is unscrewed from the filter housing body;
    wherein by unscrewing the cover from the filter housing, interaction of the internal sealing element against an interior wall of the cover, urges the filter element to rotate with the cover, engaging the bayonet protrusion with the bayonet receptacle, mounting the filter element to the filter housing, so that unpurified fuel from a raw side of the filter element can drain into the cover, and thus the unpurified fuel can be collected in the cover prior to filter element exchange;
    wherein by screwing the cover onto the filter housing, interaction of the internal sealing element against the interior wall of the cover urges the filter element to rotate with the cover, disengaging the bayonet protrusion from the bayonet receptacle, so that the filter element is vibration decoupled from the filter housing;

wherein the internal sealing element separates the raw side of the fuel filter from a water collecting chamber of the fuel filter.

9. The fuel filter according to claim 8, wherein
the filter element is suspended in the filter housing by the bayonet receptacle.

10. The fuel filter according to claim 8, wherein
the filter housing comprises an external sealing element disposed between the cover and the filter housing body.

11. The fuel filter according to claim 10, wherein
the external sealing element is a radial sealing element arranged in an external sealing element groove.

12. The fuel filter according to claim 11, wherein
the radial sealing element is an O-ring.

13. The fuel filter according to claim 10, wherein
the external sealing element is arranged in the cover.

14. The fuel filter according to claim 10, wherein
the external sealing element and the internal sealing element are arranged such that, when the cover is unscrewed, first a sealing action of the internal sealing element is canceled and subsequently a sealing action of the external sealing element is canceled.

15. The fuel filter according to claim 8, wherein
the filter housing comprises
a reversibly openable and closable drainage device for draining separated water for the water collecting chamber.

16. The fuel filter according to claim 15, wherein
the drainage device is a plug.

17. The fuel filter according to claim 8, wherein
the filter housing comprises
water level electrodes spaced apart from each other and configured to measure a water level in the filter housing.

18. The fuel filter according to claim 17, wherein
the filter housing comprises
a water level electrode column comprising a fuel drain, wherein the water level electrodes are arranged on the water level electrode column.

\* \* \* \* \*